United States Patent
Compton et al.

[15] 3,679,898
[45] July 25, 1972

[54] PHENOL MONITORING METHOD AND APPARATUS

[72] Inventors: Dinsdale M. J. Compton, Del Mar; Barry D. Epstein, San Diego, both of Calif.

[73] Assignee: Gulf Oil Corporation

[22] Filed: Aug. 20, 1970

[21] Appl. No.: 65,604

[52] U.S. Cl. ................................250/43.5 R, 250/83.3 UV
[51] Int. Cl. ..................................................G01n 21/26
[58] Field of Search ..........................................250/43.5 R Primary Examiner—James W. Lawrence
Assistant Examiner—C. E. Church
Attorney—Fitch, Even, Tabin & Luedeka

[57] ABSTRACT

A method of and apparatus for determining the quantity of phenols in an aqueous solution after treating the solution to remove interfering impurities therefrom. The treated aqueous solution is electrolytically alternately converted so as to be either acidic or basic with preselected and controlled pH values. These acidic and basic solutions are subjected to ultraviolet radiation at a preselected wavelength so that the amount of radiation passing therethrough at the preselected pH values can be measured. The measured amounts of ultraviolet radiation passing through the acidic and basic solutions are compared to determine the concentration of phenols in the aqueous solution.

18 Claims, 9 Drawing Figures

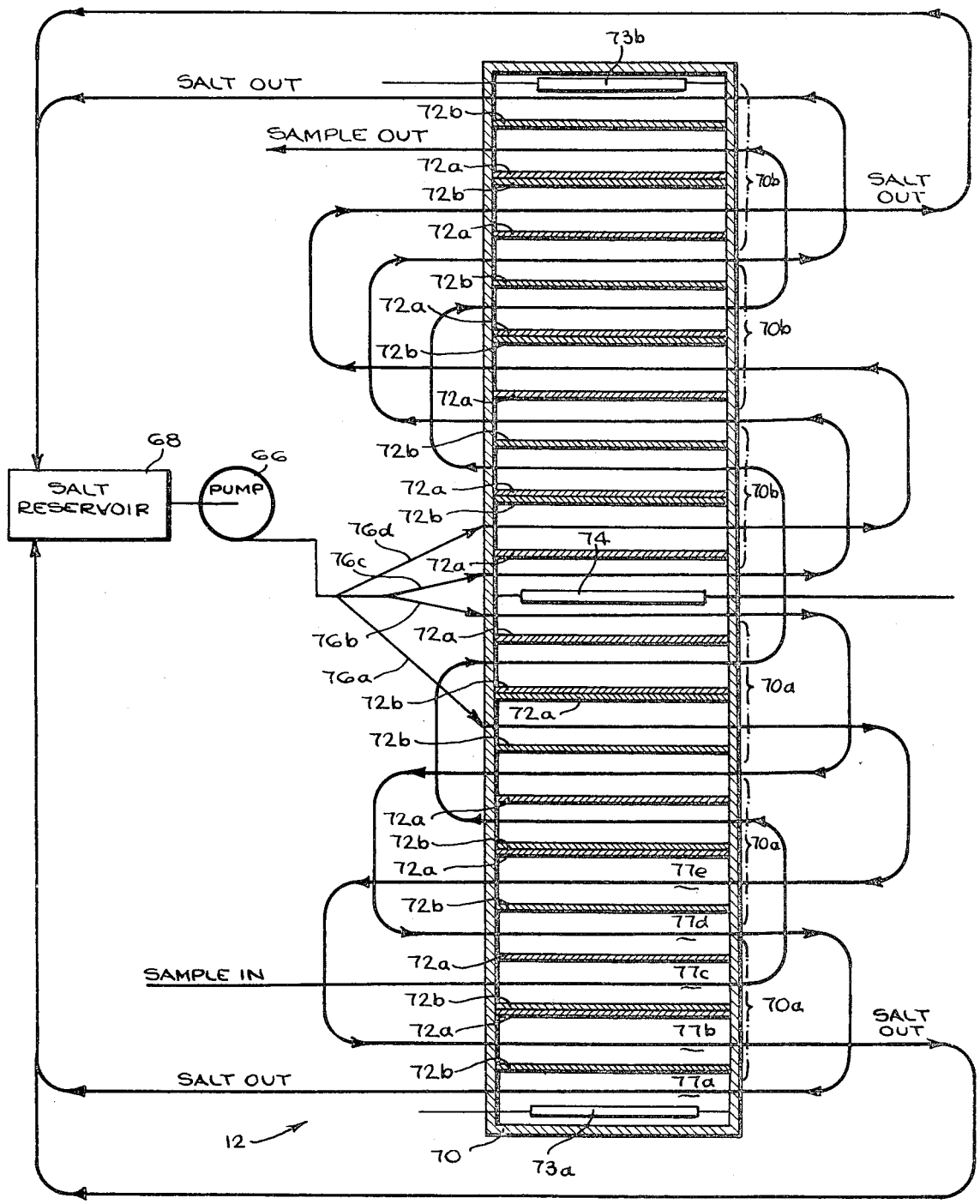

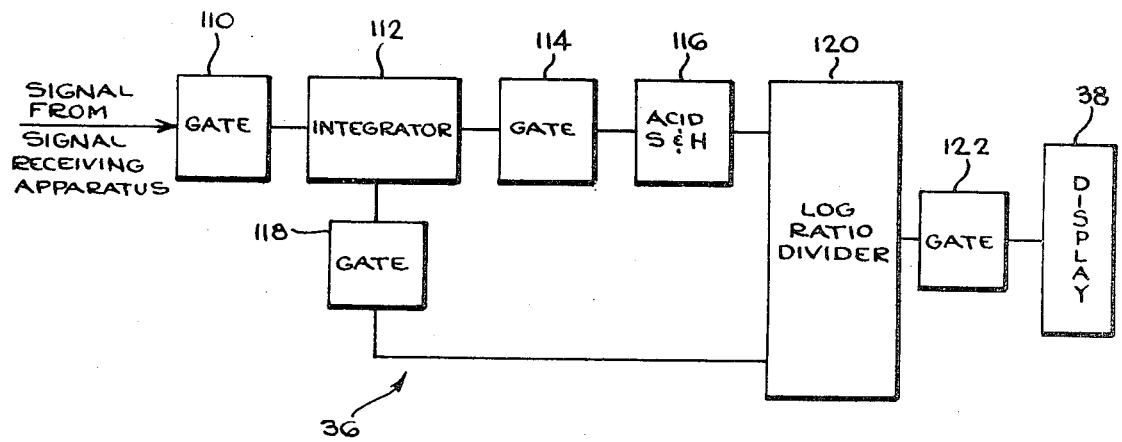
FIG.7
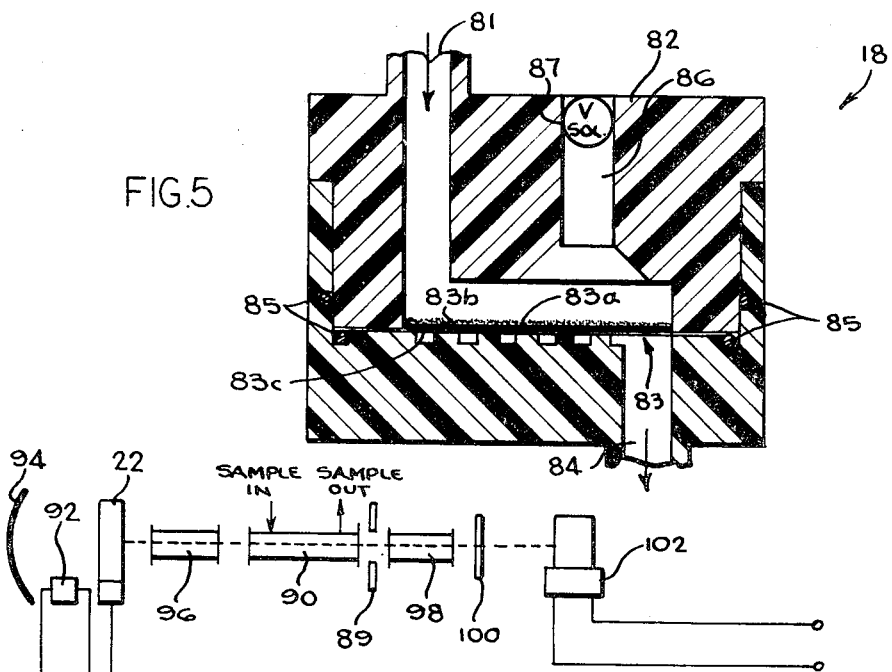
FIG.5
FIG.6
INVENTORS
DINSDALE M. J. COMPTON
BARRY D. EPSTEIN
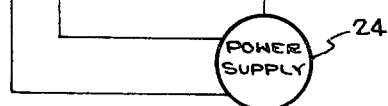
ATTYS.

PHENOL MONITORING METHOD AND APPARATUS

The present invention relates to analytically monitoring the quantity of phenols in an aqueous solution More particularly, the invention relates to determining the amount of phenols in an aqueous solution such as waste water by measuring the ratio of the ultraviolet transmission of the aqueous solution when in an acidic and in a basic phase.

One of the major pollutants of natural waterways is phenol molecules. Elaborate systems have thus been provided for removing these phenols as well as other impurities from effluent water. One existing system used for removing phenols employs a biological trickling filter that utilizes microorganisms to digest the organic impurities in the water. These microorganisms can digest phenol molecules up to a concentration of 500 mg/l, so long as the microorganisms in the culture are not shocked by a sharp increase in phenol concentration, e.g., an increase of up to 50 mg/1, as this reduces significantly the effectiveness of the filter. Hence, it is desirable to continuously monitor the phenol concentration to protect the microorganisms from a sharp increase in concentration.

A known system for continuously monitoring phenols is based on the fact that the ultraviolet transmission of the phenol solution changes with the pH of the sample analyzed. It has been found that when the pH of the solution is increased, the phenols are converted into corresponding phenoxide ions and their absorption peak shifts to a longer wavelength. As other impurities in the hydrous solution containing the phenols that absorb ultraviolet radiation in the same region as the phenols do not exhibit this wave length shift, the differential absorption at a suitable wavelength, e.g. 2,925 A, as the pH is changed can be used to measure the phenol concentration. The pH can be increased by adding sodium hydroxide to the aqueous solution containing the phenols. Similarly, the pH of the aqueous solution can be lowered by adding sulfuric acid thereto. The difference in ultraviolet absorption of either altered solution relative to the original solution or of both of the altered solutions can be measured in a dual beam spectrophotometer and subsequently recorded as a function of time.

Several problems have been observed with the above-described method. If dual optical cells are used in measuring the ultraviolet absorption of the acidic and basic solutions, a precipitate will tend to build up on the windows of the optical cell during the alkaline cycle, interfering with the ultraviolet absorption measurement. Consequently, the cells for the acidic and basic solutions have to be continuously interchanged in order to permit effective transmission of the ultraviolet radiation. Moreover, use of the dual cells makes it difficult to electronically process the absorption data. When the window of one optical cell becomes covered with a precipitate, a difference in ultraviolet absorption appears that cannot be electronically distinguished from absorption due to the presence of phenols in the aqueous solution. A further problem with the above-described technique is that an acid and an alkali must be respectively added to the aqueous solution passing through the two optical cells to provide standard solutions.

Accordingly, a principal object of the present invention is to provide an improved method of and apparatus for monitoring the phenol content in an aqueous solution.

Another object of the invention is to provide a method for determining the quantity of phenols in waste water or the like rapidly, reliably and continuously.

Yet another object of the invention is to provide apparatus for measuring the quantity of phenols in an aqueous solution that does not permit build-up of precipitates which interfere with the measuring of the ultraviolet absorption of the phenols contained in the aqueous solution.

These and other objects of the invention will become apparent with reference to the following description and accompanying drawing in which:

FIG. 4 is a plan view in diagrammatic form of a representative electrolytic cell employing the principle of the unit cell shown in FIG. 3;

FIG. 5 is a sectional elevational view of apparatus useful in treating the solution after passage through the electrolytic cell;

FIG. 6 is a view in diagrammatic form of optical and signal receiving apparatus used in the method shown in FIG. 1;

FIG. 7 is a diagrammatic representation of apparatus for analyzing the ultraviolet transmission data concerning the aqueous solution to determine the concentration of phenols therein;

FIG. 9 is a calibration curve for translating the radiation transmission data into usable form.

Figure 1:
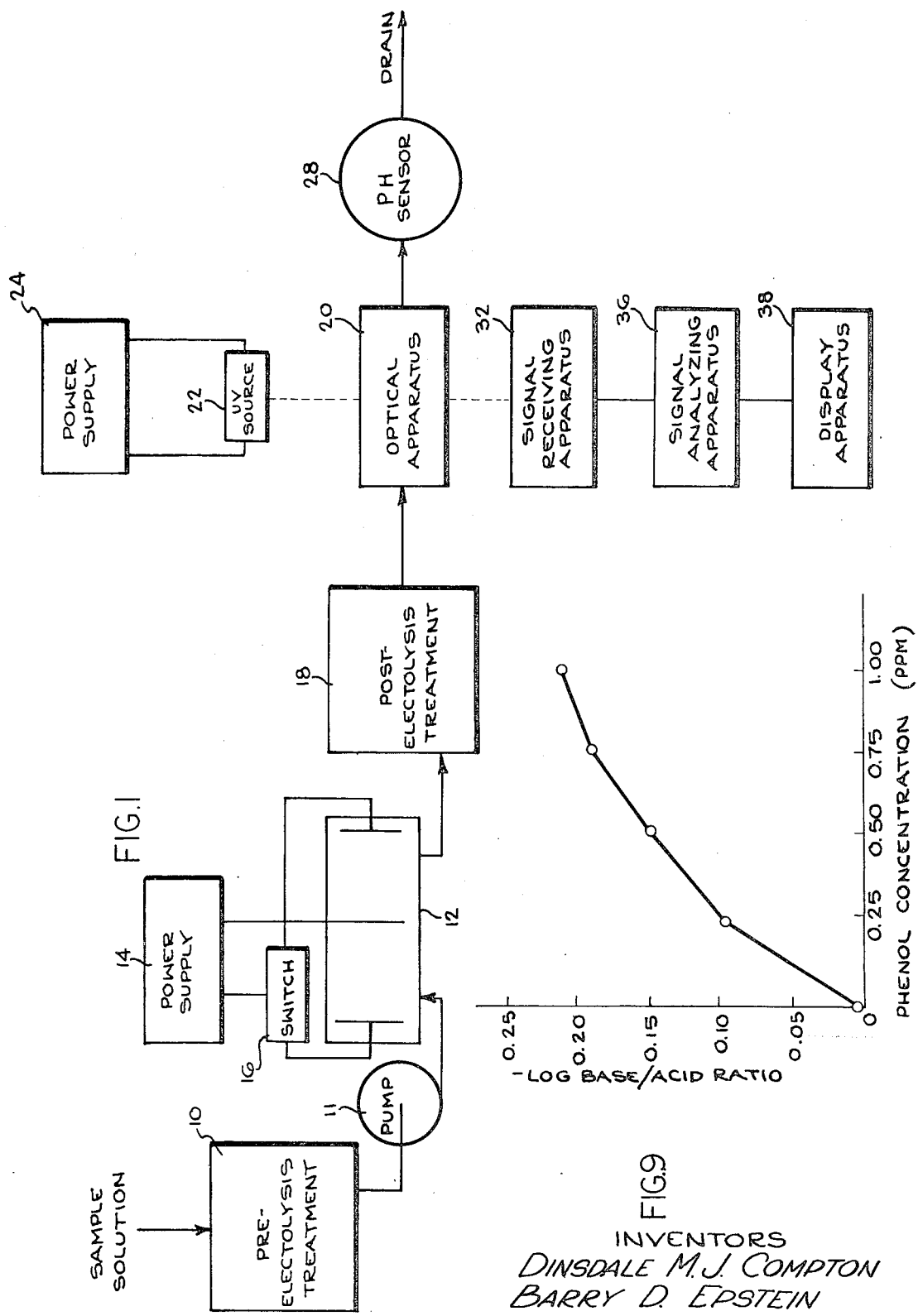
FIG. 1 is a diagrammatic representation of the method of determining the quantity of phenols in an aqueous solution in accordance with the present invention.

Referring to FIG. 1 of the drawing, there is shown a diagrammatic representation of a method of monitoring the quantity of phenols in an aqueous sample solution. Generally, the method comprises initially passing the sample solution to be monitored through pre-electrolysis treating apparatus 10 to remove from the solution interfering impurities. The treated sample solution containing phenol molecules is transported by a pump 11 into an electrolytic cell 12 operated by a constant current power supply 14 where the aqueous solution is alternately converted so as to be either acidic or basic with preselected and controlled pH values. A switch 16 alternately connects the anodes of the cell to the power supply so as to provide an acidic or basic sample flowing through the cell. The acidic and basic solutions are directed to post-electrolysis treating apparatus 18 where any precipitates which might be present are removed therefrom. The treated acidic or basic solution then passes through optical apparatus 20 where ultraviolet radiation is directed through the acidic or basic solution. An ultraviolet source 22, having a power supply 24, directs radiation at a preselected wavelength through the acidic or basic solution passing through the optical apparatus 20. After being exposed to ultraviolet radiation, the solution is passed through a pH sensor 28 that checks the alkalinity or acidity of the solution. Ultraviolet radiation passing through the optical apparatus 20 is received by signal receiving apparatus 32 and electronically analyzed by signal analyzing apparatus 36, which compares the amount of ultraviolet radiation passing through the acidic and basic solutions at the preselected pH value and wavelength to determine the concentration of phenols in the sample solution. The receiving apparatus 32 and the signal analyzing apparatus 36 connect with a suitable power supply. Subsequently, the resulting ultraviolet absorption data is read on a display apparatus 38.

The basic for the present method for differentially determining phenol concentration in the sample solution, is as follows: It is known that a number of phenols, e.g., hydroxy benzene, cresols, and xylenols, have very similar absorption spectra. The wavelength for maximum absorption and the absorptivity at this wavelength for the phenols depend strongly upon whether the molecules are ionized. In a basic solution, e.g., having a pH of about 12, the predominant species is the phenoxide ion, i.e., an ion comprising a ring having oxygen ions appurtenant thereto. Several classes of phenols in basic solution give ions which have maximum ultraviolet absorption at a wavelength of about 2,900 A and an absorptivity of about 3,000 liters per mole centimeter. In an acid solution, e.g., having a pH of about 2, however, the absorption of the unionized phenol, i.e., a molecule comprising a ring having hydroxyl ions appurtenant thereto, at a wavelength of about 2,900 A is quite small. Other compounds which contribute to the background absorption of the sample apparently do not change their absorptivity with a change in pH at a wavelength of 2,900 A.

Hence, there is a basis for differentially measuring phenol concentration.

Figure 2:
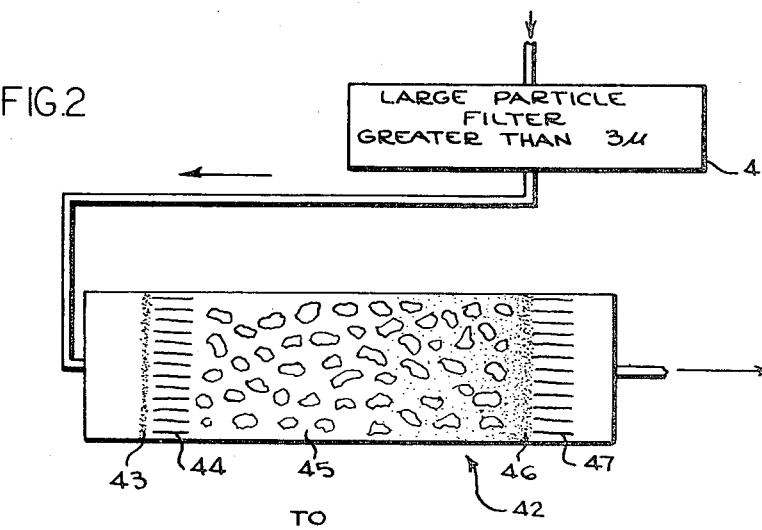
FIG. 2 is a view in diagrammatic form of apparatus for initially treating the aqueous solution.

To remove many of the interfering impurities such as iron, dirt and dust from the solution, thus improving sensitivity, the solution is initially passed through the preelectrolysis treating apparatus 10. A preferred form of treating apparatus for removing dirt, iron and other undesirable substances from the aqueous solution is shown in FIG. 2. As there shown, the treating apparatus 10 comprises in combination a particle filter 40 and a filter cartridge 42. The filter 40 desirably removes particles of size greater than 3 microns from the aqueous solution as these particles scatter light and hence interfere with ultraviolet transmission. A filter having a porous polypropylene element has been found suitable for this purpose. Comprising the filter cartridge 42 is a plurality of successive layers of filtering materials for effectively removing iron particles and the like. The filter cartridge 42 shown in FIG. 2 includes in order of direction of fluid flow from the filter 40 at least a first layer 43 of diatomaceous earth, such as that sold under the tradename "Celite" by Johns-Manville, a layer of glass wool 44, a plurality of cation exchange resin beads 45, such as that sold either under the tradenames "Amberlite" by Rohm & Haas or "Dowex" by Dow Chemical, followed by additional layers of diatomaceous earth 46 and glass wool 47. It is also possible to employ a filter using the principle of reverse osmosis in lieu of the filter cartridge 42.

After the sample solution has been treated in the treating apparatus 10 to remove therefrom interfering impurities, the phenol-containing aqueous solution is directed by the pump 11 to the electrolytic cell 12 where the sample is alternately converted into an acidic or a basic solution. The pump 11 can be of any suitable type for transporting aqueous solutions, such as a bellows metering pump, operating at a flow rate of about 15 ml/min and containing a minimum dead volume.

Figure 3:
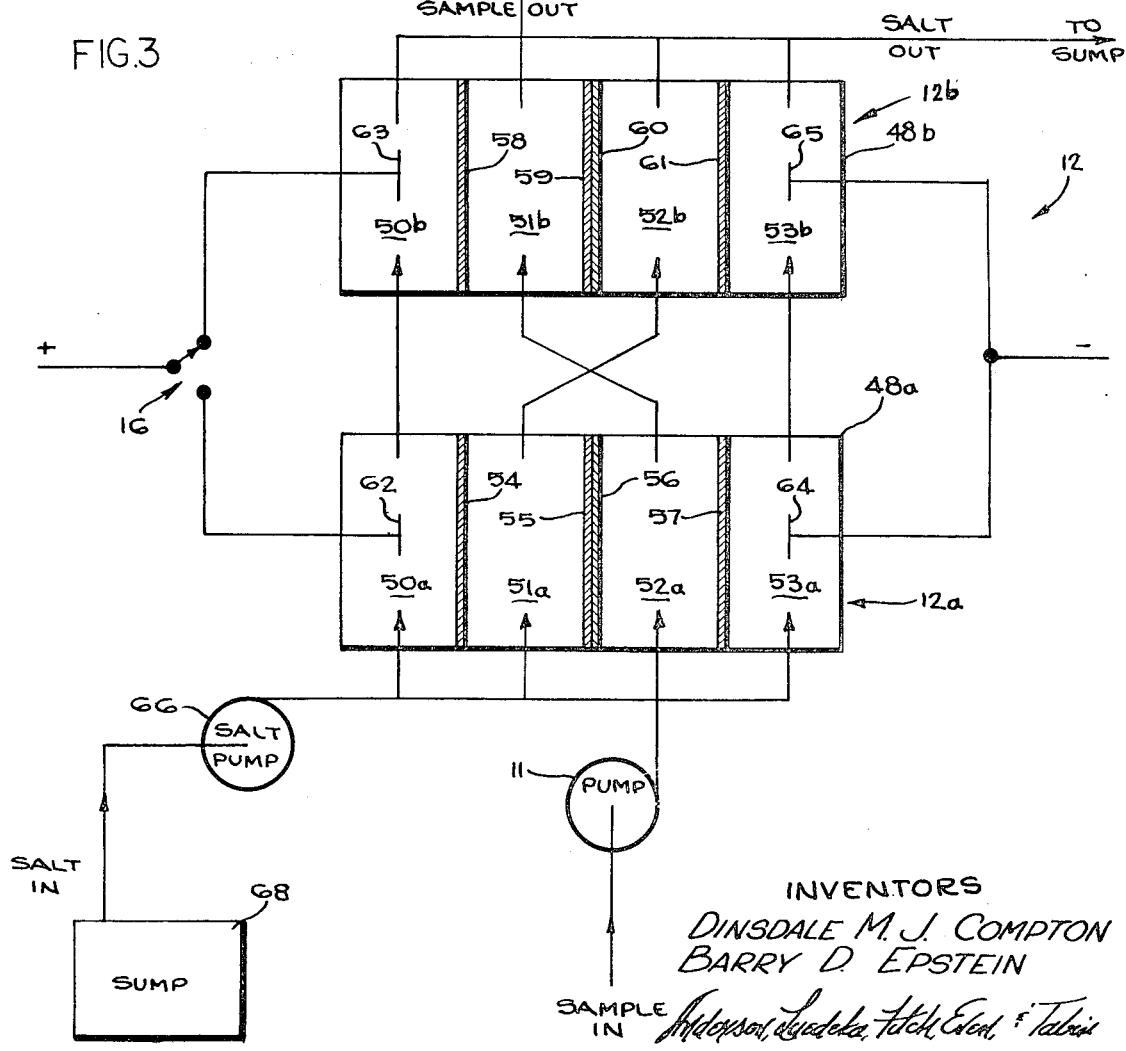
FIG. 3 is a diagrammatic view of a pair of electrolytic unit cells used for altering the aqueous solution so as to be acidic or basic in accordance with the method.

A simple form of electrolytic cell 12 which is suitable for converting the sample solution so as to be alternately acidic or basic is diagrammatically illustrated in FIG. 3. This cell structure is formed of a pair of interconnecting sub-cells 12a and 12b, which are identical except for the flow path of salt and sample solutions therethrough. Each sub-cell has a cell body 48a and 48b, respectively, and is separated into four sections or compartments, 50a, 51a, 52a and 53a in sub-cell 12a and 50b, 51b, 52b and 53b in sub-cell 12b. Membranes 54 through 61 which are selectively permeable to anions and cations separate the sub-cells into the compartments, each membrane being about 0.051 in. thick. Thus, membranes 54, 56, 58 and 60 are permeable to cations and membranes 55, 57, 59, and 61 are permeable to anions. In separating sub-cell 12a into compartments, the cationic selective membrane 54 separates the compartments 50a from the adjacent compartment 51a. Compartments 51a and 52a are separated by a composite membrane structure formed of the membranes 55 and 56 held in juxtaposition by suitable pressure, the anionic selective membrane 55 facing the compartment 51a and the cationic selective membrane 56 facing the compartment 52a. Compartments 52a and 53a are separated by the membrane 57, which is anionic selective. Sub-cell 12b is separated into compartments in substantially the same manner.

Compartments 50a and 50b of the respective sub-cells 12a and 12b each contain an anode 62 and 63 of suitable noncorroding material, such as platinum. Compartments 53a and 53b of the respective sub-cells each contain a cathode 64 and 65 of nickel or other suitable electrode material. Thus, there is an anode and a cathode in the opposite end sections of each subcell, the anode being separated from the remainder of the respective cell by a cationic selective membrane and the cathode being separated by an anionic selective membrane.

The sample solution from the pre-electrolysis treatment apparatus 10 is pumped through the sub-cells 12a and 12b by the pump 11. The solution is directed first through compartment 52a of the sub-cell 12a and then through compartment 51b of the sub-cell 12b. A salt solution, typically sodium sulfate, is pumped through the remaining compartments of the sub-cells by a salt pump 66 from a sump or reservoir 68. The function of the salt solution is to provide ions that permit alteration of the pH of the sample solution when a suitable voltage is placed between the anode and cathode of each sub-cell. The switch 16 alternately connects the anodes 62 and 63 of the sub-cells to the positive terminal of the power supply 14. The cathodes 64 and 65, on the other hand, each remain connected to the negative terminal of the power supply 14.

When the switch 16 connects the anode 62 of the sub-cell 12a to the power supply 14, the anions of the salt solutions, e.g., the sulfate ions, present in the compartment 53a are caused to migrate by the electric current flowing through the sub-cell through the anionic permeable membrane 57 into the compartment 52a, wherein the sample solution is flowing. Simultaneously, hydrogen ions formed by the splitting of water molecules at the interface of the composite membrane 55 and 56 are caused to migrate into the compartment 52a. Thus, the sample solution flowing through the compartment 52a of the sub-cell 12a is made acidic by the sulfate and hydrogen ions entering into that compartment. The flow of the solutions and the electric current can be set to predetermined values so that the sample solution attains a desired pH as equilibrium is reached.

When the switch 16 connects the anode 63 of the sub-cell 12b to the power supply 14, the cations of the salt solution, e.g., the sodium ions, present in the compartment 50b of the sub-cell are caused to migrate by the electric current flowing through the sub-cell through the cationic permeable membrane 58 into the compartment 51b, wherein the sample solution is flowing. At the same time, hydroxyl ions formed by the splitting of water molecules at the interface of the composite membrane 59 and 60 are caused to migrate into the compartment 51b. Thus, the sample solution flowing through the compartment 51b is made basic by the hydroxyl and sodium ions entering into that compartment.

In the cell structure described, deposits formed in the sub-cell 12b during the basic cycle, i.e., when the switch 16 connects the anode 63 to the power supply 14, are dissolved by the sample solution flowing therethrough during the acid cycle, i.e., when the switch 16 connects the anode 62 to the power supply. This construction further avoids contamination of the sample solution by the products of electrolysis formed at the surfaces of the respective electrodes. Gas produced at each electrode is removed from the compartment in which it is formed by the salt solution flowing therethrough.

Although a simple electrolytic cell 12 of the type shown in FIG. 3 will form acidic and basic sample solutions of preselected pH values, in practice, a more sophisticated apparatus is advantageously employed. Referring now to FIG. 4 of the drawing, it can be seen that in the preferred form of the electrolytic cell 12, a single cell body 70 is divided into a plurality of acidic and basic sub-cells 70a and 70b, respectively, for producing the acidic and basic sample solutions of preselected pH values. As shown in FIG. 4, there are typically three acidic sub-cells and three basic sub-cells arranged in series. The pH of the aqueous solution can be adjusted within the cell 12 to any value between about 2 and 12. A plurality of ion selective permeable membranes 72, similar to those described in conjunction with FIG. 3, for permitting transference of selected ions, are disposed within the cell, the membranes dividing the cell into compartments and being arranged such that anionic selective membranes 72a alternate with cationic selective membranes 72b. One membrane in each sub-cell is a composite structure formed of anionic and cationic selective membranes 72a and 72b held in juxtaposition by suitable pressure. The aqueous solution flows into the acidic section comprising the sub-cells 70a of the cell and flows out through the basic section comprising the sub-cells 70b of the cell. Two anodes 73a and 73b, made of platinum or the like, are utilized for electrolysis, one at either end of the cell 12, while a common cathode 74, formed of nickel or other suitable electrode material, is employed in the center of the cell between the respective pluralities of acidic and basic cell sections. The anodes and cathode are controlled by the power supply 14, which produces a constant current of about 300 ma at a voltage of up to 60 volts. The constant current allows the pH values of the aqueous solutions to be controlled at preselected levels.

In operation of the electrolytic cell 12 shown in FIG. 4, an ionized aqueous salt solution for providing ions for converting the pH of the aqueous sample solution is introduced into the electrolytic cell 12 by the salt pump 66 capable of pumping up to 700 ml/min of salt solution from the salt reservoir 68. Preferably, the salt enters the cell 12 through a salt inflow 76 in four streams 76a, 76b, 76c and 76d, two on each side of the common cathode 74 so that salt solution is provided for each of the plurality of sub-cells. Contemporaneously, the aqueous solution is introduced into a compartment 77c in the first acidic sub-cell 70a between an anionic selective membrane 72a and a composite membrane 72b and 72a, the salt solution in the streams 76a and 76b, respectively, flowing in compartments 77b and 77d separated from the aqueous sample on either side thereof by the membranes. When the first anode 73a is in operation, the anions, e.g., sulfate ions, of the highly ionized salt in the stream 76b migrate through the membrane 72a from the compartment 77d to form an ionized solution with the hydrogen ions contemporaneously migrating from the interface of the composite membrane structure through the membrane 72b thereof, thereby forming an acidic sample in the first acidic sub-cell 70a of the electrolytic cell 12. This acidic sample is substantially a sulfuric acid solution when sodium sulfate is the salt. Advantageously, the relatively acidic sample solution passes through a plurality of acidic sub-cells 70a, so that the sample is made sufficiently acidic before exiting the cell. After the acidified aqueous sample exits the plurality of acidic sub-cells 70a, it is directed through the plurality of basic sub-cells 70b.

It is desirable to return the remainder of the salt solution in the stream 76b to the salt reservoir 68 to have a continuous salt flow without the continual addition of neutralizing chemicals to the salt solution. However, it is first necessary to neutralize this salt stream so that the reservoir 68 is not contaminated. Neutralization of the stream 76b is accomplished as the cations, e.g., the sodium ions, therein migrate through a cationic selective membrane 72b on the opposite side of the compartment 77d as the anionic selective membrane 72a through which the anions migrate to the compartment 77c holding the sample solution. Hence both anions and cations have migrated from the salt stream 76b so that it is neutral. The cations enter the adjacent compartment 77e where the salt stream 76a is flowing. In that compartment hydroxyl ions migrating from the interface of the composite membrane of the adjacent sub-cell 70a are also present. These ions interact to produce a neutral salt stream 76a. All the salt streams are returned to the ion neutral reservoir 68.

The switch 16 which is connected to the power supply 14 determines whether the acidic or basic cycles are in operation. If the switch 16 is set so that the first anode 73a is in operation along with the common cathode 74, then the sample solution is acidified in the plurality of acidic sub-cells and passes through the basic sub-cells without being affected. However, the acidic sample solution dissolves accumulated precipitates in the basic sub-cells while flowing therethrough. Hence, the present electrolytic cell 12 is substantially self-cleaning. On the other hand, if the switch 16 is set so that the second anode 73b is in operation along with the common cathode 74, then the sample solution is not affected in the acidic sub-cells but is basified in the basic sub-cells. The two anodes are not operated concurrently by the switch 16. The switch 16 for determining whether the acidic or basic cycle is in the electrolytic cell 12 is in operation is desirably a wafer type switch controlled by a stepping motor. It is contemplated, however, that any other suitable switching device might be employed.

The basic sample is formed in the plurality of basic sub-cells 70b of the cell 12. As the aqueous sample solution flows into the first of the plurality of basic sub-cells, the cations, e.g., the sodium ions, of the salt stream 76c are attracted to the cathode 74 when the second anode 73b is in operation. The sodium ions of the stream 76c migrate from a compartment in which they are flowing through a cationic selective membrane 72b separating the salt stream from the sample solution to interact with hydroxyl ions migrating thereto from the interface of the composite structure of anionic and cationic selective membranes 72a and 72b of the sub-cell 70b to form a basic sample. This basic sample is substantially a sodium hydroxide solution when sodium sulfate is the salt. Desirably, the basic sample passes through a plurality of sub-cells 70b. Hence, the basic sub-cells 70b operate in substantially the reverse manner as the acidic sub-cells 70a. Again, it is desirable to return the remainder of the salt stream 76c to the reservoir 68. First, however, the stream 76c is neutralized by losing its sulfate ions to the salt solution in the salt stream 76d in the adjacent compartment separated therefrom by an anionic selective membrane 72a. The stream 76d in turn is neutralized by the hydrogen ions split at the interface of the adjacent composite ion-selective membranes before being returned to the neutral reservoir 68. Thus, the sample is alternately formed into either substantially acidic or basic samples before leaving the cell.

The alternately created acidic and basic samples of preselected and controlled pH values are directed for further treatment through the post-electrolysis treating apparatus 18. The post-electrolysis treating apparatus 18 primarily serves the function of removing precipitates and other insoluble materials from the basic solution (and also from the acidic solution) prior to the direction of ultraviolet radiation therethrough. It also allows periodic venting of gases such as carbon dioxide which come out of solution. As shown in FIG. 5, the post-electrolysis treatment apparatus 18 generally includes a solution inflow 81, a body 82 having an interior opening into which the solution flows, a combination filter element 83 for removing the precipitates from the relatively basic or acidic sample, and a solution outflow 84. The body is fabricated of any suitable material, such as plastic, plexiglas or the like, and has a waffle-shaped internal structure for supporting the filter element 83. Preferably, the combination filter element 83 comprises a coating 83a of diatomaceous earth, such as that sold under the tradename "Celite" by Johns-Manville, on a sheet of porous polypropylene filter material presized to about 0.45 microns. The diatomaceous earth prevents the pores of the polypropylene from clogging. The coating 83a and polypropylene sheet 83b are attached to a backing 83c, which is maintained in contact with the body 82 by a plurality of O-ring seals 85 or the like. The filter 83 is self-cleaning as the acidic sample passing therethrough dissolves the precipitates filtered out during the basic cycle. A vent passageway 86 is provided for the periodic escape of gas therethrough. A solenoid-operated valve 87 controlled by a timing switch (not shown) is disposed at the upper portion of the passageway 86 and is adapted to be periodically opened to vent gas, e.g., carbon dioxide, that accumulates in the passageway.

In order to measure the amount of ultraviolet radiation passing through the acidic and basic samples at a preselected pH value and at a preselected wavelength while avoiding the build-up of interfering precipitates, the optical apparatus 20 is provided, which by absorption spectrometry permits alternate measurement of the amount of ultraviolet radiation passing through the sample during the acidic and basic cycles. A suitable ultraviolet source 22 is employed. This source is preferably a quartz neon source, which produces radiation having a narrow wavelength band at about 2,967 A. The power supply 24 which connects to the source 22 is preferably servo-regulated so that the intensity of the source is maintained within a range of about 1 percent. A reference detector 92, preferably a photodiode, is advantageously employed either adjacent to or behind the sourse 22 and provides a feedback current to power supply 24 so as to maintain the intensity of the source 22 constant. A concave mirror 94 is desirably disposed behind the ultraviolet source 22 to intensify and direct the radiation produced.

Comprising the optical apparatus 20 for allowing transmission of ultraviolet radiation through the aqueous solution is a cuvette or optical cell 90. Ultraviolet radiation provided by the ultraviolet source 22 passes through a suitable collimator 89 for narrowing the beam of radiation after passing longitudinally through the optical cell 90 and the sample solution flowing therethrough. The optical cell 90 preferably has quartz windows at the ends thereof so that radiation transmission is not interfered with and is typically about 5 centimeters in length. After passing through the optical cell 90, the acidic or basic sample solution desirably passes through the pH sensor 28, which may be of any suitable type, to check the actual pH of the solution and then exits to the drain.

Before and after passing longitudinally through the optical cell 90, the ultraviolet radiation is directed through at least one of the optical filters 96, 98 on either side of the cell, which further comprise the optical apparatus 20. Each of the optical filters 96 and 98 serves the function of absorbing any extraneous ultraviolet radiation of wavelengths other than bout 2,900 A, while passing wavelengths between about 2,650 and 3,600 A. Although two such filters 96 and 98 are shown, it is also contemplated to provide one large filter in lieu of two smaller ones. Each of the optical filters contains a fluid mixture of nickel chloride and cobalt chloride at a concentration of 100 grams per liter, with an acid phenol in an amount of about 1,000 ppm. Furthermore, an interference filter 100 is disposed in the path of radiation after the second optical filter 98 to further absorb all radiation wavelengths other than about 2,900 to 2,925 A. It should be apparent that other wavelength "windows" might also be utilized for measuring the transmittance of the sample solution. The interference filter 100 is desirably of the type containing a metal film element such as silver or the like. Thus, the filters 96,98, and 100 remove from consideration by the analyzing apparatus radiation wavelengths other than that at which the transmittance of the phenols is to be measured. Other methods of monochromation can also be used.

After the ultraviolet radiation has passed through the interference filter 100, the radiation that has not been absorbed by the phenol-containing solution is detected by the signal receiving apparatus 32. The radiation reaching the apparatus 32 is a measure of the transmittance of the sample solution. Since the sample solution in the optical cell 90 is alternately either acidic or basic, the level of radiation measured by the signal receiving apparatus 32 will vary with the changing pH. This variation in transmittance is a reflection of the change in the structure of the absorbing molecules upon a change in pH in the solution being measured. The signal receiving apparatus 32 consists of a photomultiplier tube 102 of any suitable type although any appropriate photo sensor can be employed. The signal from the photomultiplier tube 102 is integrated over controlled periods of time, thereby minimizing the effect of noise and spurious signals.

After the amounts of radiation passing through the acidic and basic solutions have been alternately received by the photomultiplier tube 102, the radiation signals are analyzed to determine the concentration of phenols in the sample solution. In FIG. 7, there is shown a diagrammatic representation of the signal analyzing apparatus 36 which connects with the signal receiving apparatus 32. This apparatus 36 converts the received signals to logarithmic signals which are differentially combined to provide a measure of radiation absorption. The signal analyzing apparatus 36 in general comprises a first gate 110 for allowing passage of a signal from the photomultiplier tube 102 corresponding to the amount of ultraviolet radiation passing through the sample during the acidic or basic cycle in the optical apparatus 20 after the solution pH attains the preset value. It takes approximately 30 seconds for the optical cell 90 to be purged of the alternate sample solution flowing therethrough. A further waiting period of 3 minutes allows the system to stablize and the solution to attain the preset pH value. During these periods, the pH of the sample solution passing through the optical cell 90 is in transition. As it is undesirable to read the amount of radiation during this transition period, the first gate 110 remains closed. When the solution has become sufficiently acidic or basic, the signal from the signal receiving apparatus 32 is allowed through the first gate 110 into an integrator 112, wherein the signal is accumulated for a period of about 30 seconds. Following integration, and assuming the first sample measured is acidic, the signal is allowed through a second gate 114 into a sample and hold circuit 116. There the signal corresponding to the amount of radiation passing through the acidic sample solution is placed in storage until the basic cycle is completed. After the amount of ultraviolet radiation passing through the acidic solution has been measured by the apparatus described, a signal corresponding to the amount of radiation passing through the basic cycle is analyzed after a transition period of about 3.5 minutes. The basic signal is allowed through the first gate 110 and passes into the integrator 112, which has been reset, wherein the signal is accumulated for a period of about 30 seconds. As the second gate 114 is closed, the basic signal passes through an open third gate 118. The acidic and basic signals are then directed into a log ratio divider 120, the acidic signal coming from the sample and hold circuit 116 and the basic signal coming directly from the integrator 112 through the gate 118. The divider 120 computes the log ratio of the amount of radiation passing through the acidic solution to the amount of radiation passing through the basic solution. This log ratio is then allowed through a fourth gate 122, placed in storage, amplified about 20 times and displayed or printed on the display apparatus 38, in the form of an analog voltage of up to plus or minus 10 volts, where it is stored at least until the data for the following cycle is received. Typically, the display apparatus 38 is a pen recorder or the like.

Figure 8:
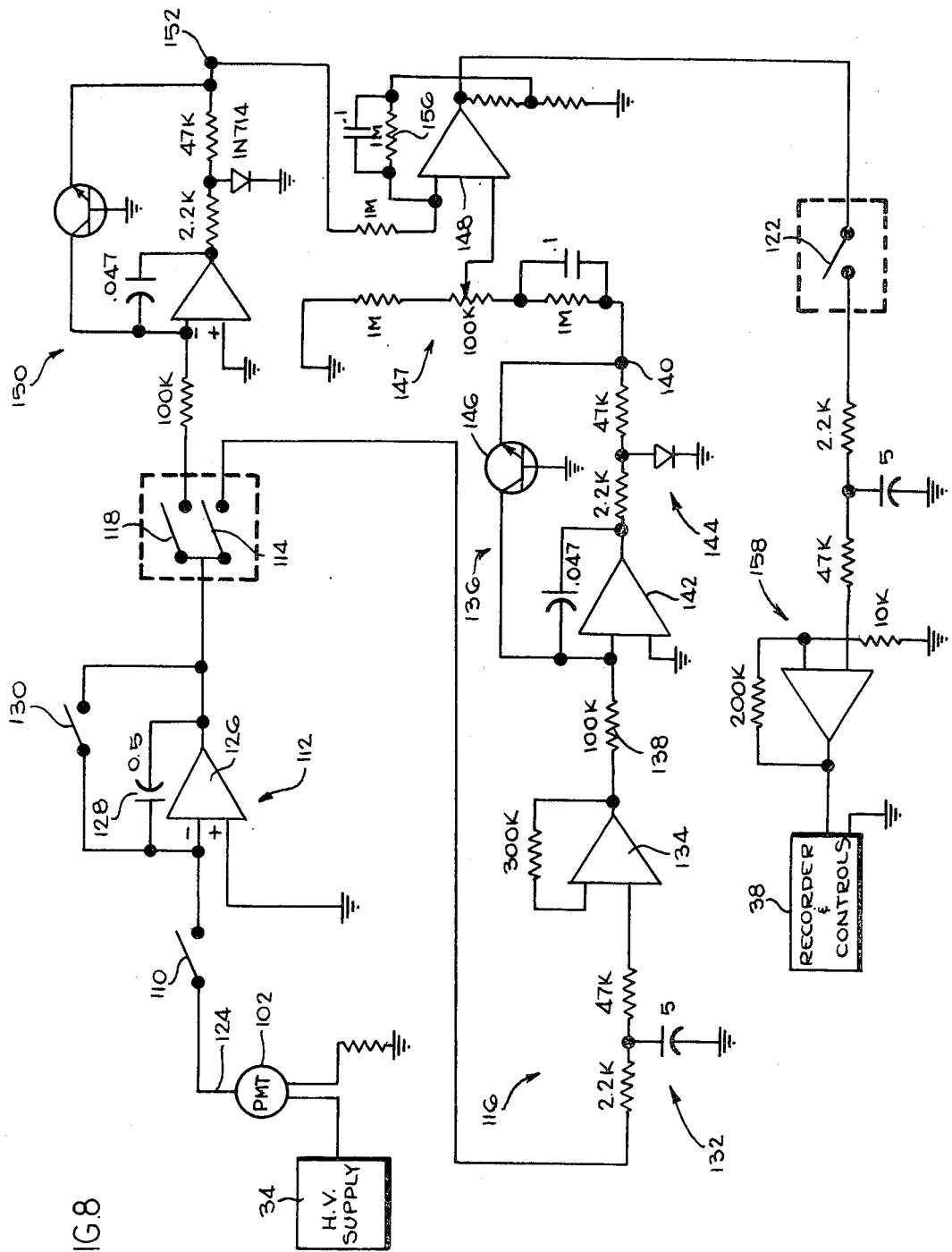
FIG. 8 is a schematic representation of apparatus for carrying out the analyzing function in accordance with the diagrammatically represented apparatus shown in FIG. 7.

Although various circuitry known, per se, may be employed to implement the signal analyzing apparatus 36 illustrated in FIG. 7, a particular circuit found to be satisfactory is shown in FIG. 8. As there shown, the photomultiplier tube 102, which is typically a 1P 28A tube, is connected in the usual manner to a negative high voltage supply (H.V.) 34 and this voltage is distributed across each of the dynodes to ground through suitable voltage-dropping resistors. The output of the photomultiplier tube is taken at the anode via a lead 124 which is fed to the input of the integrator circuit 112 through the gate 110, which may comprise a single-pole relay of conventional type. The switch contacts of the relay 110 are controlled by suitable signals generated by the motor-driven multi-wafer timing switch (not shown), which is also employed to control various other switches in the circuit such as the switch 16 to produce the desired timing and sequencing of the analyzing operations described above. Such a timing switch typically comprises a plurality of ganged wafer switches which are rotated by a driving motor, as is well known to the art, to switch various controls, relays, etc. in the desired sequence and at appropriate times.

The integrator circuit 112 comprises an operational amplifier 126 having its negative input terminal coupled to the photomultiplier tube output through the contacts of the relay 110 and its positive input terminal connected directly to ground. An integrating feedback capacitor 128 is connected between the negative input terminal and the output terminal of the operational amplifier 126, and appropriate operating voltages are applied to the amplifier 126, as well as to other amplifiers and circuits later to be described, through suitable bias resistors and filter capacitors (not shown). A normally open reset switch 130 is connected in shunt across the operational amplifier 126 to discharge the residual integrated charge of the integrator 112 at appropriate times during the operation of the apparatus. The reset switch may be a conventional relay, which is also operated by the timing switch previously mentioned.

The output of the integrator circuit 112 is fed to the gates 114 and 118 which may, themselves, be wafers on the shaft of the motor-driven timing switch. In the circuit of the illustrated system, the contacts of the switch 114 are closed during the acid analysis portion of the operating cycle, and the contacts of the switch 118 are closed during the basic analysis portion of the cycle, in each case the other switch contacts being in their open position.

During the acid analysis portion of the operating cycle, the output signal of the integrator circuit 112 is fed via the switch 114 to the sample and hold circuit 116 comprising a signal storage network 132 and an operational amplifier 134. Consequently, the output signal provided by the sample and hold circuit 116 at the output of the operational amplifier 134 corresponds to the amount of ultraviolet radiation passing through the acidic solution in the optical apparatus 20, and this signal is retained by the sample and hold circuit even though the switch contacts 114 are opened during the base analysis portion of the operation cycle.

The output signal from the sample and hold circuit 116 is coupled to a log-function circuit 136 through a coupling resistor 138 to produce a further signal at an output 140, which varies as a logarithmic function of the signal from the sample and hold circuit 116. The log-function circuit 136 comprises an operational amplifier 142 having a non-linear feedback element comprised of an NPN transistor 146 in a common base configuration connected from the negative input of the amplifier 142 to the output of the clipping circuit 144 at 140.

The logarithmic acid signal provided at the output 140 is then applied to an adjustably tapped voltage divider 147 to provide a means for adjustably calibrating the circuit. The tapped output of the voltage divider 147 is fed to the positive input terminal of a differential amplifier 148, and the other input to this amplifier 148 corresponds, as will be described below, to the logarithm of the signal from the photomultiplier tube 102 corresponding to the amount of ultraviolet radiation passing through the basic solution in the optical apparatus 20 during the basic analysis portion of the operating cycle.

Before the basic analysis portion of the operating cycle, the contacts of the switch 110 are opened and the reset switch contacts 130 are momentarily closed to discharge the integrator circuit 112. The contacts of the switch 118 are then closed and the contacts of the switch 114 are opened. The output from the integrator circuit 112 is coupled to a further log-function circuit 150 substantially identical to the log-function circuit 136 previously described in connection with the acid analysis portion of the system. The output signal provided by the log-function circuit 150 at its output 152 is applied as indicated above to the negative input terminal of the differential amplifier 148 through an input resistor. The output signal provided by the differential amplifier 148 thus corresponds to the difference between the logarithms of the acid and base analysis signals as detected by the photomultiplier tube 102. Since this output signal corresponds to the difference between logrithms, it is indicative of the logarithm of the ratio between the acid and base analysis signals.

The log ratio signal provided by the differential amplifier 148 is fed via the gate 122 to an output sample and hold circuit 158. The output signal from the output sample and hold circuit 158 is thus retained, amplified and supplied to the display apparatus 38, illustrated as a recorded, having associated control circuitry.

In the particular circuit illustrated in FIG. 8, values of resistance are given in the drawing in ohms and the values of capacitance are given in microfarads. While a specific circuit has been illustrated and described it is, of course, understood that it is merely exemplary and the various other circuits may alternatively be employed, as will be apparent to those skilled in the art.

From the information on the display apparatus 38 the quantity of phenols in the sample solution can be determined by the use of a calibration curve similar to the one shown in FIG. 9. There it can be seen that knowing the negative log of the base/acid ratio (which can be read on the display apparatus 38) permits the determination of the phenol concentration in ppm. For example, using the typical curve shown, if the negative log of the base/acid ratio is 0.15, the phenol concentration in the sample solution is about 0.50 ppm.

In the practice of the method of the present invention, and referring to FIG. 1 of the drawing, the aqueous sample solution is routed from a source of waste water or the like into the apparatus described herein above. Initially, the aqueous solution is treated by the treating apparatus 10 to remove therefrom interfering impurities. The phenol-containing sample solution is directed to the electrolytic cell 12 by the pump 11. There the sample solution is alternately electrolytically converted so as to be acidic or basic and having preselected and controlled pH values between about 2 and 12. The switch 16 alternately directs the cell to be acidic or basic by appropriate connection of the anodes to the constant current power supply 14. Next, the solutions are treated in the treating apparatus 18 to remove precipitates therefrom prior to measuring the amount of ultraviolet radiation passing therethrough. It is also contemplated that occluded gases can be removed by the treating apparatus 18. After the post-electrolytic treatment, the sample solution is passed through the optical apparatus 20. There ultraviolet radiation at a preselected wavelength is directed from the ultraviolet source 22 through the optical apparatus 20 and a signal corresponding to the amount of the ultraviolet radiation passing through the sample solution tested at the preselected pH value and wavelength is received by the signal receiving apparatus 32. After being measured, the sample solution may be passed through the pH sensor 28 to check the pH of the solution tested and is then discarded. The received signal is analyzed by the signal analyzing apparatus 36 so that the concentration of phenols in the sample solution can be determined. The result of the signal analyzing is displayed on the readout or display apparatus 38 and is translated into usable form by a calibration curve such as the one shown in FIG. 9.

Thus, the present invention provides an improved method of monitoring the quantity of phenols in aqueous solution, such as waste water, rapidly, reliably and continuously. The invention further provides a method of monitoring the amount of phenols in waste water without the build-up of precipitates which interfere with measuring the amount of ultraviolet radiation directed through the solution to determine the concentration of phenols therein.

While one specific form of the invention has been shown and described, it should be apparent that various modifications could be made therein without departing from the scope of the invention. For example, in the preelectrolysis treatment of the sample solution, apparatus employing the principle of reverse osmosis might be employed to remove from the solution dissolved solids other than phenols, or if no interfering substances are present the solution might not be treated at all.

Various of the features of the invention are set forth in the following claims.

What is claimed is:

1. A method of determining the quantity of phenols in aqueous solution, comprising the steps of:
   a. electrolytically converting a sample aqueous solution so as to be alternately acidic and basic with preselected and controlled pH values;
   b. directing ultraviolet radiation at a preselected wavelength through a cell containing the sample solution;
   c. measuring the amount of ultraviolet radiation passing through the cell during alternate cycles of the sample solution when the solutions have reached their preselected pH values and at the preselected wavelength; and
   d. comparing the measured amounts of ultraviolet radiation passing through the cell to determine the concentration of phenols in the aqueous solution.

2. A method according to claim 1 further comprising treating the aqueous solution prior to conversion to remove interfering impurities therefrom.

3. A method according to claim 1 wherein electrolytically converting the sample solution comprises splitting water between an ion exchange membrane pair by the passage of an electric current.

4. A method according to claim 1 wherein electrolytically converting the sample solution comprises alternately converting the pH of the sample solution in a single electrolytic cell.

5. A method according to claim 1 further comprising the step of treating the alternately produced acidic or basic solution to remove precipitates therefrom prior to directing the ultraviolet radiation therethrough.

6. A method according to claim 1 wherein directing the ultraviolet radiation and measuring the amount of ultraviolet radiation passing through the cell comprises the steps of passing solutions formed during the alternate acidic and basic cycles through a single optical cell, filtering the radiation passing through the cell using a filter absorbing all wavelengths other than about 2,900 A, determining the amount of radiation passing through the filter and amplifying the amount of radiation determined.

7. A method according to claim 1 further comprising integrating the measured amounts of ultraviolet radiation to minimize the effect of spurious signals.

8. A method according to claim 1 wherein comparing the measured amounts of ultraviolet radiation comprises determining the log ratio of the amount of radiation passing through the acidic solution to the amount of radiation passing through the basic solution.

9. Apparatus for determining the quantity of phenols in aqueous solution, comprising:
   a. electrolytic means for converting a sample aqueous solution so as to be alternately acidic and basic with preselected and controlled pH values;
   b. an ultraviolet source for directing ultraviolet radiation through the sample solution at a preselected wavelength;
   c. radiation measuring means for containing the converted sample solution and for determining the amount of ultraviolet radiation passing through the converted sample solution during alternate cycles of the sample solution when the solutions have reached their preselected pH values and at the preselected wavelength; and
   d. means for comparing the measured amounts of ultraviolet radiation passing through the converted sample solution to determine the concentration of phenols in the aqueous solution.

10. Apparatus according to claim 9 further comprising treating means for removing interfering impurities from the sample solution prior to conversion.

11. Apparatus according to claim 10 wherein said treating means comprises a filter having at least successive layers of diatomaceous earth, glass wool and cation exchange resin beads.

12. Apparatus according to claim 9 wherein said electrolytic means comprises a single electrolytic cell in which the acidic and basic solutions are alternately formed from the aqueous solution at preselected and controlled pH values.

13. Apparatus according to claim 9 wherein said radiation measuring means comprises a single optical cell for containing the converted sample solution and adapted to permit ultraviolet radiation to pass therethrough.

14. Apparatus according to claim 13 wherein said radiation measuring means further comprises at least one optical filter between said ultraviolet source and said optical cell for absorbing radiation of wavelengths other than about 2,900 A.

15. Apparatus according to claim 13 wherein said radiation measuring means further comprises at least one optical filter at the end of said optical cell opposite said ultraviolet source for absorbing radiation of wavelengths other than about 2,900 A.

16. Apparatus according to claim 13 wherein said radiation measuring means further comprises a photomultiplier tube adjacent the end of said optical cell opposite said ultraviolet source for determining the amount of ultraviolet radiation passing through said optical cell.

17. Apparatus according to claim 9 further comprising treating means between said electrolytic means and said radiation measuring means for removing precipitates from the basic and acidic solutions.

18. Apparatus according to claim 9 wherein said comparing means comprises first gate means for passing signals from said radiation measuring means corresponding to the amounts of ultraviolet radiation passing through the converted sample solution, integrator means for accumulating the signals corresponding to the amounts of radiation passing through the sample solution, storage means for receiving a signal from said integrator means and sampling and holding the signal corresponding to the amount of radiation passing through the acidic sample, second gate means for passing a signal from said integrator means corresponding to the amount of radiation passing through the basic sample, third gate means for passing a signal from said storage means corresponding to the amount of radiation passing through the acidic sample and means for receiving the signals corresponding to the amounts of radiation passing through the acidic and basic samples and computing the log ratio of the amount of radiation passing through the acidic sample to the amount of radiation passing through the basic sample.

* * * * *